US010828734B2

(12) United States Patent
Li et al.

(10) Patent No.: US 10,828,734 B2
(45) Date of Patent: Nov. 10, 2020

(54) AUTOMATIC SPRING FASTENER ASSEMBLY MACHINE

(71) Applicant: DONGGUAN UNIVERSITY OF TECHNOLOGY, Dongguan (CN)

(72) Inventors: Chuan Li, Dongguan (CN); Yun Bai, Dongguan (CN)

(73) Assignee: DONGGUAN UNIVERSITY OF TECHNOLOGY, Dongguan (CN)

(*) Notice: Subject to any disclaimer, the term of this patent is extended or adjusted under 35 U.S.C. 154(b) by 63 days.

(21) Appl. No.: 16/399,020

(22) Filed: Apr. 30, 2019

(65) Prior Publication Data
US 2019/0337105 A1 Nov. 7, 2019

(30) Foreign Application Priority Data
May 2, 2018 (CN) .......................... 2018 1 04117169

(51) Int. Cl.
 *B23P 19/04* (2006.01)
 *B23P 19/00* (2006.01)
 (Continued)

(52) U.S. Cl.
CPC ........... *B23P 19/048* (2013.01); *B23P 19/002* (2013.01); *B23P 19/004* (2013.01); *B23P 19/006* (2013.01); *B23P 19/008* (2013.01); *B23P 19/107* (2013.01); *B23P 19/12* (2013.01); *B23P 21/004* (2013.01); *B65G 27/04* (2013.01); *B65G 47/82* (2013.01);
(Continued)

(58) Field of Classification Search
CPC ..... B23P 19/048; B23P 19/002; B23P 19/006; B23P 19/004; B23P 19/008; B23P 19/12; B23P 19/107; B23P 21/004; Y10T 29/49609
See application file for complete search history.

(56) References Cited

U.S. PATENT DOCUMENTS 4,715,114 A * 12/1987 Yajima .................. B23P 19/004
198/430

* cited by examiner

*Primary Examiner* — Jermie E Cozart
(74) *Attorney, Agent, or Firm* — Law Offices of Steven W. Weinrieb

(57) ABSTRACT

The present invention relates to an automatic spring fastener assembly machine, including a rack and a power control box, and the rack is provided with a circulating conveying device, and a rubber casing feeding device, a fastener feeding device and a spring loading device which are in turn arranged around the circulating conveying device. The rubber casing feeding device includes a rubber casing vibration tray disposed to the left front side of the circulating conveying device, and the rubber casing feeding vibration tray is connected with a rubber casing distributing block through the rubber casing conveying track. The upper side of the circulating conveying device is provided with a rubber casing transportation manipulator, and the right front side thereof is provided with a rubber casing clamping device located below the rubber casing transportation manipulator, and a fastener pushing in device fitting the circulating conveying device is disposed under the rubber casing clamping device. In the present invention, material feeding and conveying is done by the circulating conveying device, and fasteners are fitted into corresponding holes on the rubber casings from a higher position with the fastener pushing in device, which can be completed fast and efficiently, is easy to operate, realize quick assembly of spring fasteners and improve working efficiency.

10 Claims, 10 Drawing Sheets

(51) Int. Cl.
*B23P 21/00* (2006.01)
*B23P 19/12* (2006.01)
*B23P 19/10* (2006.01)
*B65G 27/04* (2006.01)
*B65G 47/82* (2006.01)

(52) U.S. Cl.
CPC ..... *B65G 2812/03* (2013.01); *Y10T 29/49609* (2015.01)

AUTOMATIC SPRING FASTENER ASSEMBLY MACHINE

FIELD OF THE INVENTION

The present invention relates to a non-standard part automatic assembly machine, and more particularly to an automatic spring fastener assembly machine.

BACKGROUND OF THE INVENTION

There is a new type of spring fastener, the structure thereof being shown in FIG. 13, which includes a rubber casing 69 and four sockets 70 disposed on the surface of the rubber casing 69. A spring and a fastener 71 are sequentially plugged into the sockets 70, and the fastener 71 is snap-fitting the socket 70. During assembly, due to the small size of the workpiece, manual assembly is time-consuming and labor-intensive, and assembly is inconvenient, thereby production efficiency is low and labor cost increases.

SUMMARY OF THE INVENTION

The object of the present invention relates to an automatic spring fastener assembly machine, material feeding and conveying is done by the circulating conveying device, and fasteners are fitted into corresponding holes on the rubber casings from a higher position with the fastener pushing in device, which can be completed fast and efficiently, is easy to operate, realize quick assembly of spring fasteners and improve working efficiency.

In order to achieve the above object, the technical solution adopted by the present invention is: an automatic spring fastener assembly machine, including a rack and a power control box, the rack is provided with a circulating conveying device, and a rubber casing feeding device, fastener feeding device and spring loading device, which are sequentially disposed around the circulating conveying device; the rubber casing feeding device includes a rubber casing feeding vibration tray disposed to the left front side of the circulating conveying device, and the rubber casing feeding vibration tray is connected with a rubber casing distributing block through a rubber casing conveying track, a rubber casing transportation manipulator fitting the rubber casing distributing block is disposed above the circulating conveying device, and a rubber casing clamping device located below the rubber casing transportation manipulator is disposed on the right front side thereof; a fastener pushing in device fitting the circulating conveying device is disposed below the rubber casing clamping device, and the right side of the rubber casing transportation manipulator is provided with a discharging device located on the rack; all of the circulating conveying device, the rubber casing feeding vibration tray, the rubber casing transportation manipulator, the rubber casing clamping device, the fastener pushing in device and the discharging device are electrically connected to the power control box.

Further, the circulating conveying device includes a conveying support disposed on the rack, the conveying support is provided with a conveying drive motor and a conveyor sprocket fitting each other, fastener carriers are evenly disposed on the conveyor sprocket along the conveying direction, the left side of the conveying support is provided with an excess material detection device located between the rubber casing transportation manipulator and the fastener feeding device, and the rear end of the conveying support, which functions with the fastener carrier, is provided with a carrier positioning device located on the rack, a carrier support fitting with the bottom of the fastener carrier is disposed below the carrier positioning device, and the carrier support is on the rack; the conveying drive motor, excess material detection device and the carrier positioning device are electrically connected to the power control box.

Further, the fastener carrier includes a carrier seat provided on the conveyor sprocket, and the carrier seat are provided with four sets of fastener positioning sleeves, the interior of the fastener positioning sleeve is provided with a through hole penetrating through the bottom of the carrier seat, and the through hole is provided with a slot fitting the fastener.

Further, the carrier positioning device includes positioning support bracket provided on the rack, a positioning lifting cylinder is provided vertically downward on the positioning support bracket, the output end of the positioning lifting cylinder is connected to a rod seat, and two sets of positioning rods are symmetrically provided on the rod seat, and the positioning rod is plug-in fitting a transportation positioning hole provided on the carrier seat, the positioning lifting cylinder is electrically connected to the power control box.

Further, the rubber casing clamping device includes a rubber casing clamping support provided on the rack, a clamping and lifting cylinder is disposed vertically upward on the rubber casing clamping support, and the output end of the clamping and lifting cylinder is connected to a clamping and lifting table, one side of the clamping lifting platform adjacent to the circulating conveying device is horizontally disposed with a rubber casing rotating cylinder along the conveying direction, and the other side thereof is vertically provided with a baffle pushing cylinder along the conveying direction; the output end of the rubber casing rotating cylinder is connected to a rubber casing rotating table, the front end of the rubber casing rotating table is provided with a rubber casing clamping gripper fitting the left and right side of the rubber casing; the output end of the baffle pushing cylinder is connected to a upper baffle slidably fitting the upper side of the rubber casing in the rubber casing clamping gripper; the rubber casing clamping gripper, the rubber casing rotating cylinder, the baffle pushing cylinder and the Clamping and lifting cylinder are all electrically connected to the power control box.

Further, the fastener pushing in device includes a fastener pushing in support provided on the rack, a fastener pushing in cylinder is vertically upward provided on the fastener pushing in support, and the output end of the fastener pushing in cylinder is connected to a pushing in sliding block, and the upper end of the pushing in sliding block is provided with a pushing rod pedestal, and the pushing rod pedestal is provided with a fastener pushing rod plug-in fitting the through hole within the carrier seat; the fastener pushing in cylinder is electrically connected to the power control box.

Further, the fastener feeding device includes a fastener feeding vibration tray provided on the rack, the fastener feeding vibration tray is sequentially connected with a fastener conveying track and a fastener distributing block, the discharge end of the fastener distributing block is provided with a fastener rotating device, a fastener conveying device is provided above the fastener rotating device, the fastener rotating device includes a fastener rotating support seat provided on the rack, the fastener rotating support seat is horizontally provided with a fastener shuttling cylinder, the output end of the fastener shuttling cylinder is connected to a fastener shuttling sliding block slidably fitting the fastener rotating support seat, the fastener shuttling sliding block is horizontally provided with a fastener rotating cylinder, the output end of the fastener rotating cylinder is connected to a fastener rotating table, on the left end of the fastener rotating table is horizontally provided with a fastener clamping cylinder, the left end of the fastener clamping cylinder is provided with a fastener steering clamping claw fitting the fastener distributing block, the fastener steering clamping claw is provided with a fastener clamping slot connected to the discharge end of the fastener distributing block, the fastener feeding vibration tray, the fastener shuttling sliding block; the fastener rotating cylinder, the fastener clamping cylinder and the fastener steering clamping claw are all electrically connected to the power control box.

Further, the fastener conveying device includes a fastener conveying support provided on the rack, and the fastener conveying support is horizontally provided with a fastener conveying cylinder and a fastener conveying sliding track parallel to each other; the output end of the fastener conveying cylinder is connected with a fastener conveying sliding block slidably fitting the fastener conveying sliding track; the fastener conveying sliding block is vertically downward provided with a fastener lifting cylinder, and the output end of the fastener lifting cylinder is connected to a fastener reclaiming and positioning cylinder provided vertically, the output end of the fastener reclaiming and positioning cylinder is connected to a fastener feeding gripper fitting the side of the fastener, and a fastener reclaiming rod fitting the fastener is vertically disposed at the gap in the middle of the fastener feeding gripper; all of the fastener conveying cylinder, the fastener lifting cylinder, the fastener shuttling cylinder and the fastener feeding gripper are electrically connected to the power control box.

Further, the spring loading device includes a spring feeding vibration tray provided on the rack, and the spring feeding vibration tray is sequentially connected to a spring conveying track and a spring distributing block, the discharge end of the spring distributing block is provided with a spring rotating device, a spring conveying device is provided above the spring rotating device; the spring rotating device includes a spring rotating support seat provided on the rack, the spring rotating support seat is horizontally provided with a spring shuttling cylinder, the output end of the spring shuttling cylinder is connected to a horizontally provided spring rotating cylinder, the output end of the spring rotating cylinder is provided with a spring rotating table, on the left end of the spring rotating table is horizontally disposed with a spring turning gripper fitting the spring distributing block; the spring feeding vibration tray, the spring rotating cylinder and the spring turning gripper are electrically connected to the power control box.

Further, the spring conveying device includes a spring conveying support seat provided on the rack, the spring conveying support seat is horizontally provided with a spring conveying cylinder and a spring conveying sliding track parallel to each other, the output end of the spring conveying cylinder is connected with a spring conveying sliding block slidably fitting the spring conveying sliding track; the spring conveying sliding block is vertically downward provided with a spring elevating cylinder, the output end of the spring elevating cylinder is provided with a spring reclaiming and positioning cylinder, the output end of the spring reclaiming and positioning cylinder is connected to a spring feeding jaw fitting the spring rotating device; all of the spring feeding jaw, the spring front and rear cylinder, the spring elevating cylinder and the spring conveying cylinder are electrically connected to the power control box.

The beneficial effects of the invention are:

In the present invention, material feeding and conveying is done by the circulating conveying device, and fasteners are fitted into corresponding holes on the rubber casings from a higher position with the fastener pushing in device, which can be completed fast and efficiently, is easy to operate, realize quick assembly of spring fasteners and improve working efficiency.

The design of the circulating conveying device adopts the sprocket track circulation for feeding and conveying, consequently, running speed of the said track is fast, and the stability thereof is good; the design of the excess material detection device can detect whether there is a workpiece on the fastener carrier, and prevent the occurrence of jamming in the subsequent assembly process, and thereby ensure the normal operation of the device.

The design of the fastener carrier locates the fastener through a slot provided in the fastener positioning sleeve to prevent the fastener from rotating due to the vibration of the device during conveying.

The design of the carrier positioning device is locating the carrier seats on both sides of the conveyor sprocket by plugging and fitting two positioning rods to achieve precise positioning of the fastener carriers, and to ensure accurate feeding and assembly of the fastener and the spring.

The design of the rubber casing clamping device is to clamp two rubber casings with the clamping jaws, and then turn the rubber casings for 180° by the rotating cylinder, thereby facilitating the assembly of the fasteners on the upper and lower sides of the rubber casing.

The fastener pushing in device is designed to complete the assembly of four spring fasteners by installing four sets of fastener pushing rods on the pushing rod holder, and then turning the workpiece over by the rubber casing rotating device, thereby the automatic assembly of the eight spring fasteners is completed in one time, and the production efficiency of which is high.

The design of the fastener feeding device automatically and continuously feeds to the spring turning gripper through the vibration tray, and then the fastener is rotated by 90° by the rotating cylinder of the fastener, which is beneficial to the reclaiming of the fastener feeding gripper.

The design of the fastener conveying device is to clamp the fastener with the fastener feeding gripper, and the fastener reclaiming rod is inserted into the inside of the fastener to ensure that the fastener remains vertical during conveying and stabilize the center of gravity, thereby facilitating the vertical insertion of the fastener into the fastener positioning sleeve.

The design of the spring loading device also automatically and continuously feeds to the spring turning gripper through the vibration tray, and then the spring is rotated by 90° by the spring rotation cylinder, which is beneficial to the reclaiming of the spring feeding jaw.

REFERENCE NUMBER DESCRIPTIONS

The drawings include following integers:
1—Rack;
2—Fastener pushing in device;
3—Circulating conveying device;
4—Rubber casing feeding vibration tray;
5—Rubber casing transportation manipulator;
6—Fastener conveying device;
7—Fastener feeding vibration tray;
8—Spring conveying device;
9—Spring feeding vibration tray;
10—Discharging device;
11—Rubber casing clamping device;
12—Conveying support;
13—Conveyor sprocket;
14—Conveying drive motor;
15—Rubber casing distributing block;
16—Excess material detection device;
17—Carrier positioning device;
18—Carrier support;
19—Fastener carrier;
20—Transportation positioning hole;
21—Carrier seat;
22—Fastener positioning sleeve;
23—Positioning rod;
24—Positioning lifting cylinder;
25—Positioning support bracket;
26—Rubber casing clamping gripper;
27—Rubber casing rotation table;
28—Rubber casing rotation cylinder;
29—Upper baffle;
30—Baffle pushing cylinder;
31—Clamping and lifting table;
32—Rubber casing clamping support;
33—Clamping and lifting cylinder;
34—Fastener pushing in support;
35—Fastener pushing in cylinder;
36—Pushing in sliding block;
37—Pushing rod pedestal;
38—Fastener pushing rod;
39—Spring conveying track;
40—Spring feeding jaw;
41—Spring reclaiming and positioning cylinder;
42—Spring elevating cylinder;
43—Spring conveying sliding block;
44—Spring conveying sliding track;
45—Spring conveying cylinder;
46—Spring rotation device;
47—Fastener conveying track;
48—Fastener rotation device;
49—Fastener rotation support;
50—Spring rotation cylinder;
51—Spring rotation table;
52—Spring turning gripper;
53—Spring distributing block;
54—Fastener rotation support;
55—fastener shuttling cylinder;
56—fastener shuttling sliding block;
57—Fastener rotation cylinder;
58—Fastener rotation table;
59—Fastener clamping cylinder;
60—Fastener steering clamping claw;
61—Fastener conveying support;
62—Fastener reclaiming rod;
63—Fastener feeding gripper;
64—Fastener reclaiming and positioning cylinder;
65—Fastener conveying cylinder;
66—Fastener conveying sliding track;
67—Fastener conveying sliding block;
68—Fastener lifting cylinder;
69—Rubber casing;
70—Socket;
71—Fastener.

DETAILED DESCRIPTION OF THE ILLUSTRATED EMBODIMENT

The present invention will be described in detail below with reference to the accompanying drawings, the description of the present invention is only exemplary and explanatory, and should not be construed as limiting the scope of the present invention.

Figure 1:
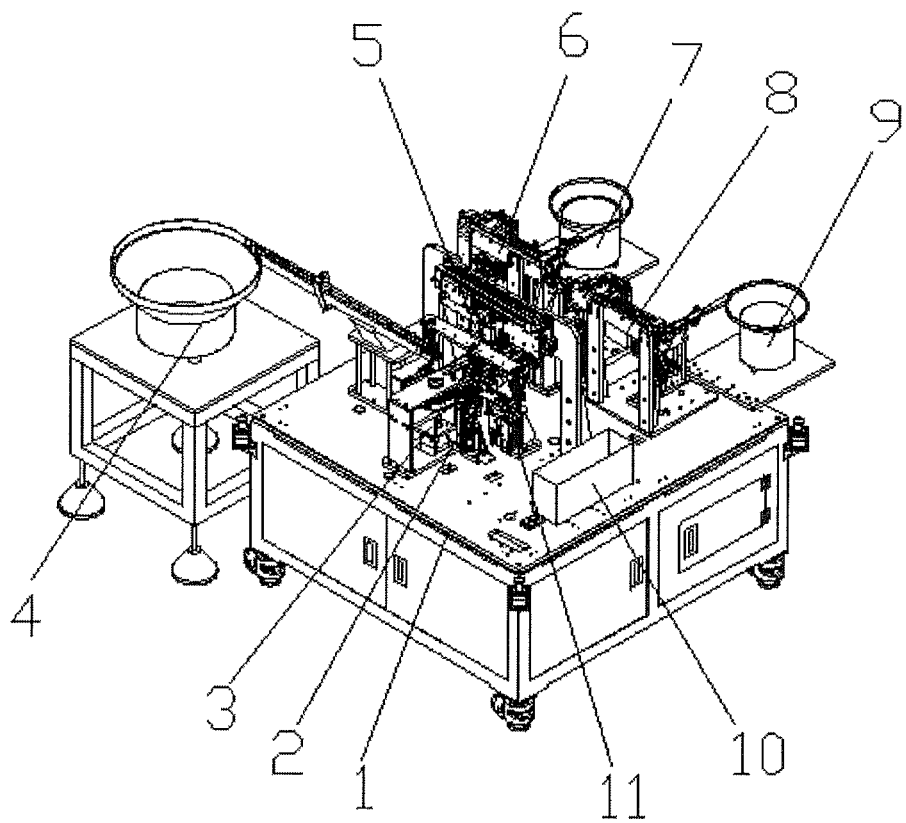
FIG. 1 is a schematic perspective view of the present invention.
Figure 2:
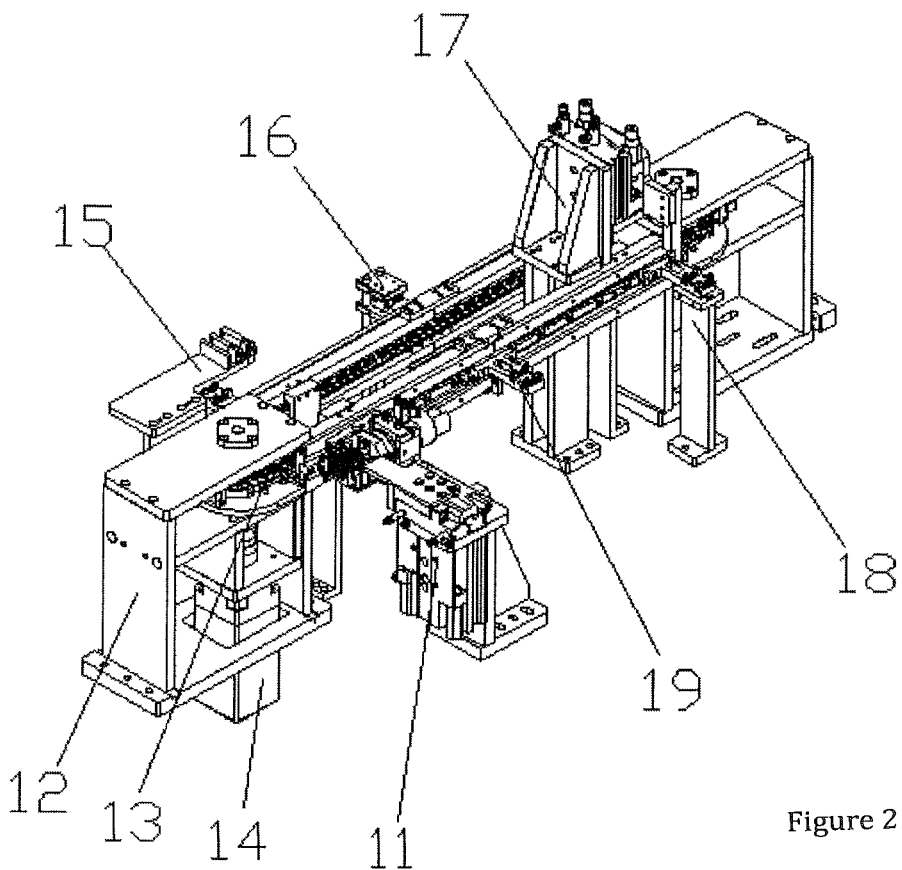
FIG. 2 is a schematic perspective view of the circulating conveying device.
Figure 3:
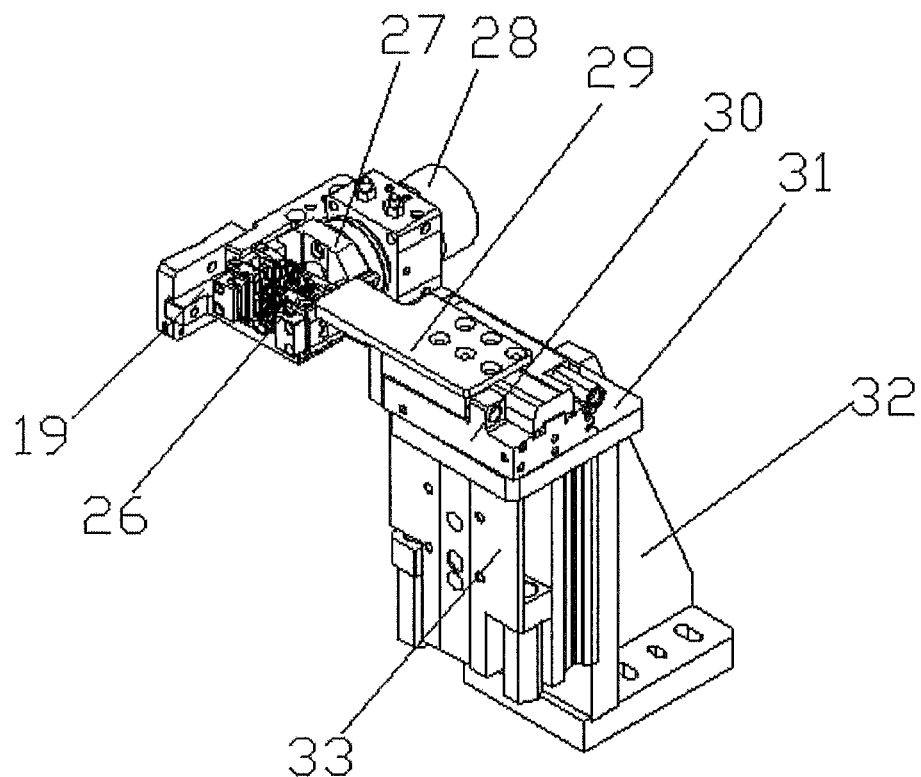
FIG. 3 is a schematic perspective view of the rubber casing rotation device.
Figure 4:
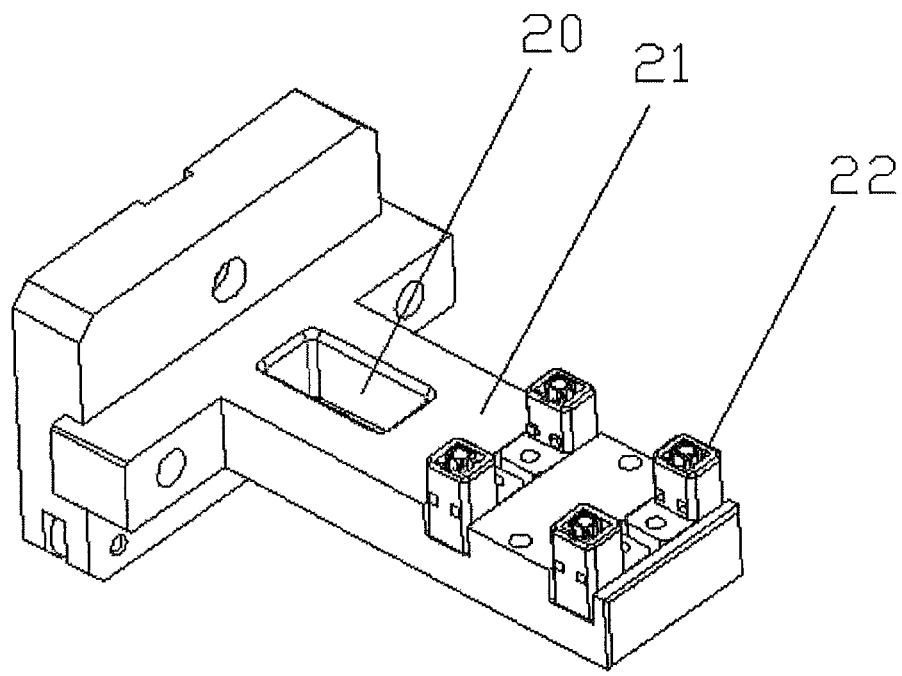
FIG. 4 is a schematic perspective view of the fastener carrier.
Figure 5:
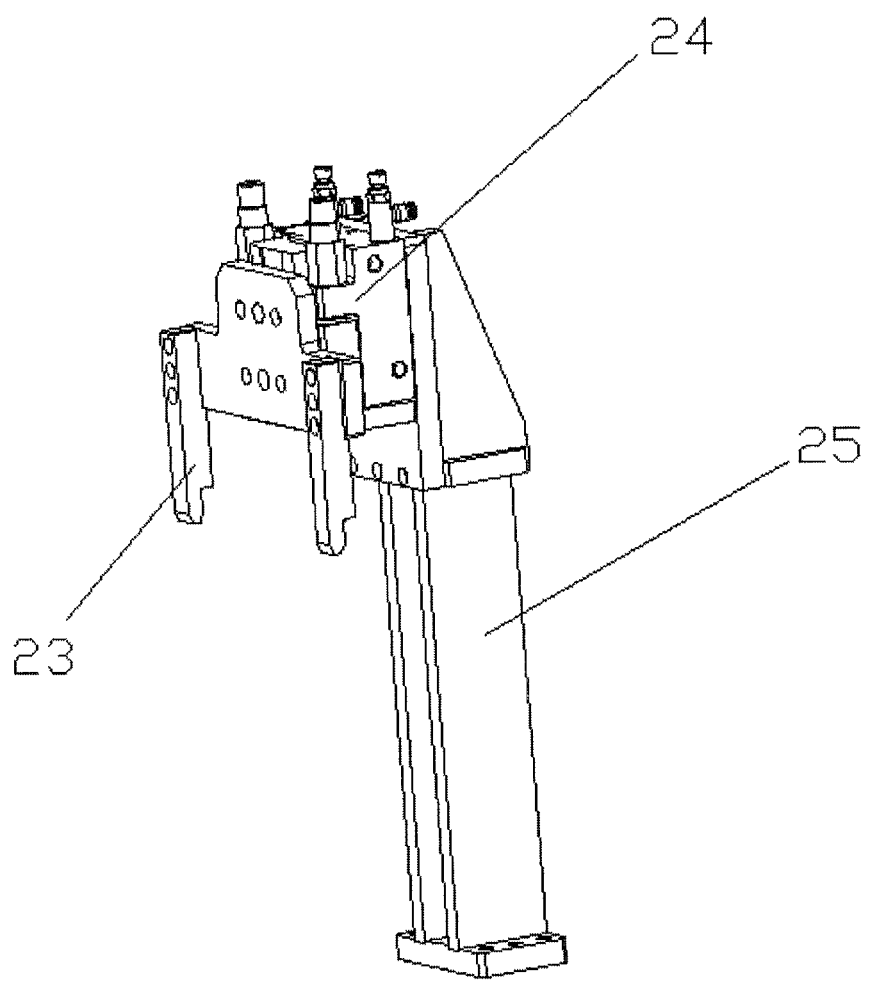
FIG. 5 is a schematic perspective view of the carrier positioning device.
Figure 6:
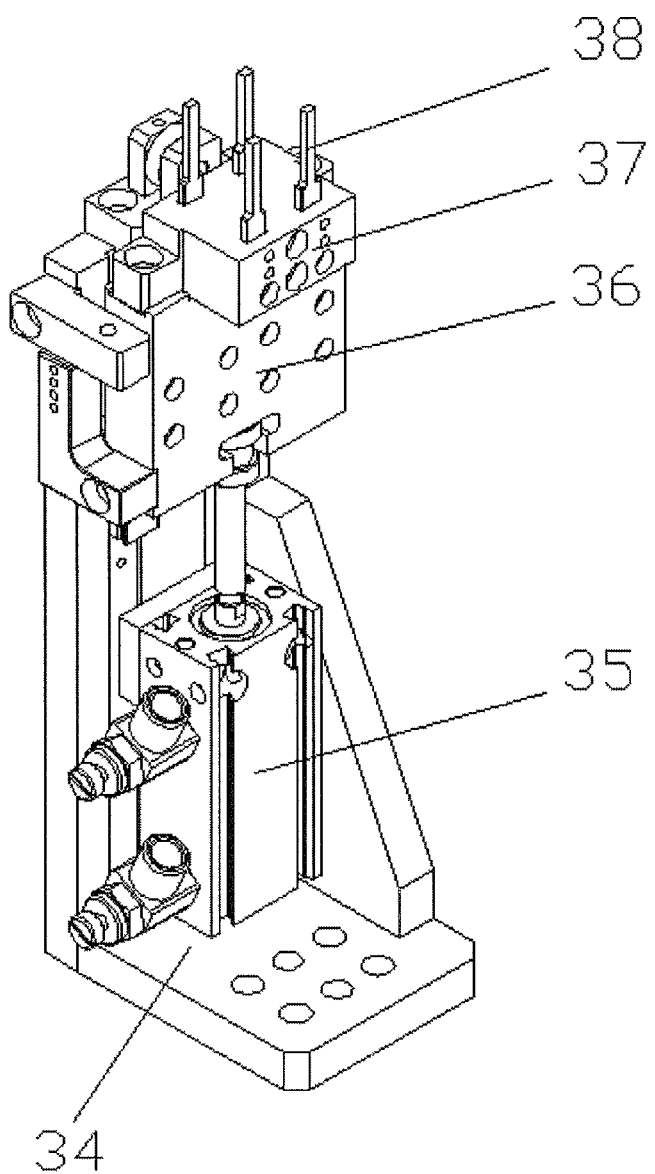
FIG. 6 is a schematic perspective view of the fastener pushing in device.
Figure 7:
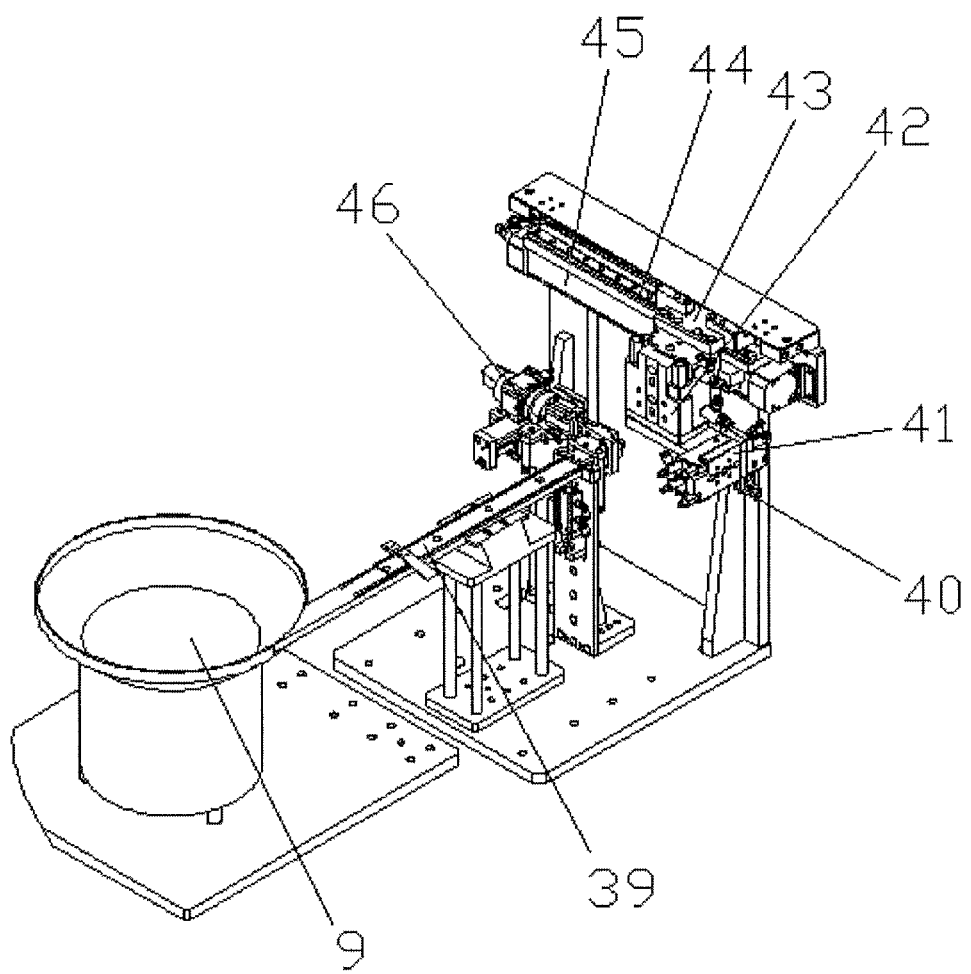
FIG. 7 is a schematic perspective view of the spring loading device.
Figure 8:
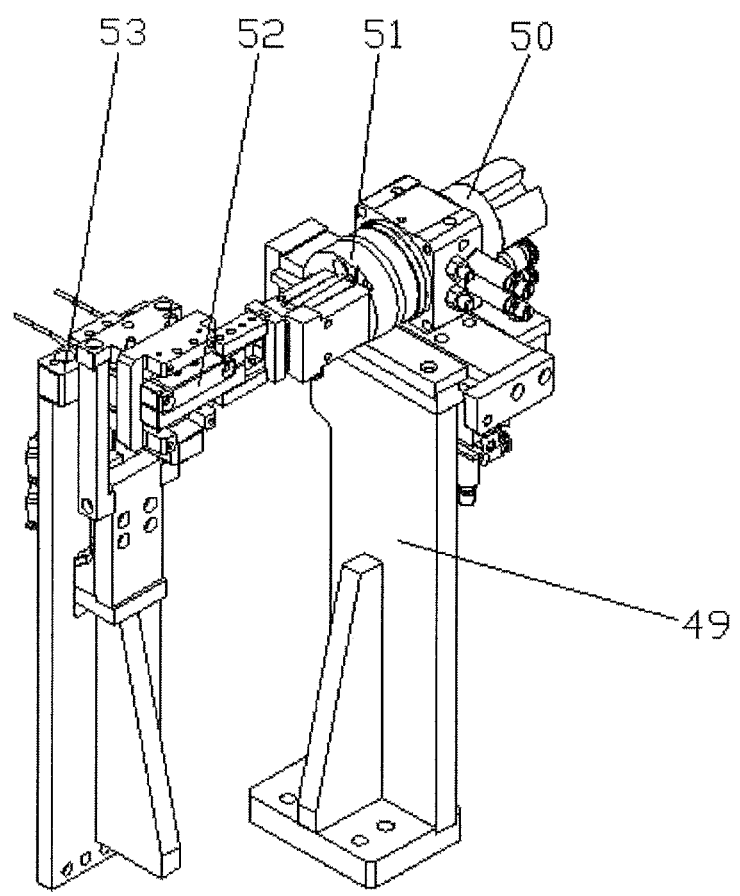
FIG. 8 is a schematic perspective view of the spring rotation device of FIG. 7.
Figure 9:
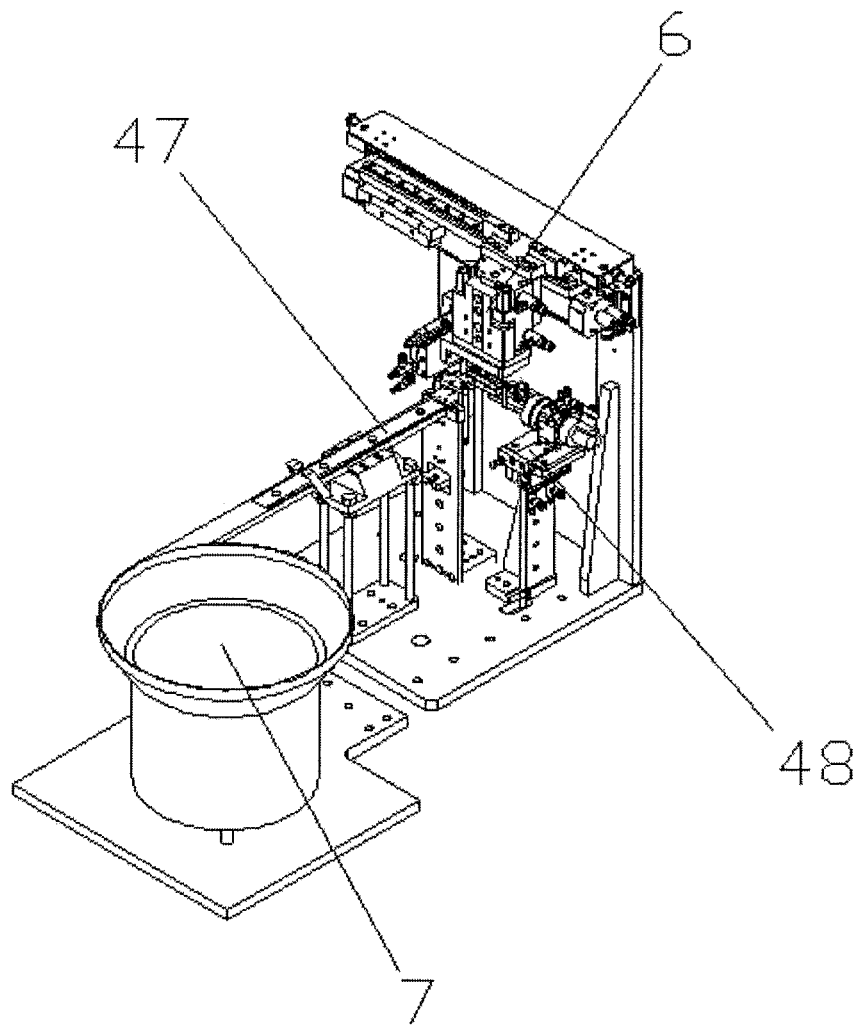
FIG. 9 is a schematic perspective view of the fastener feeding device.
Figure 10:
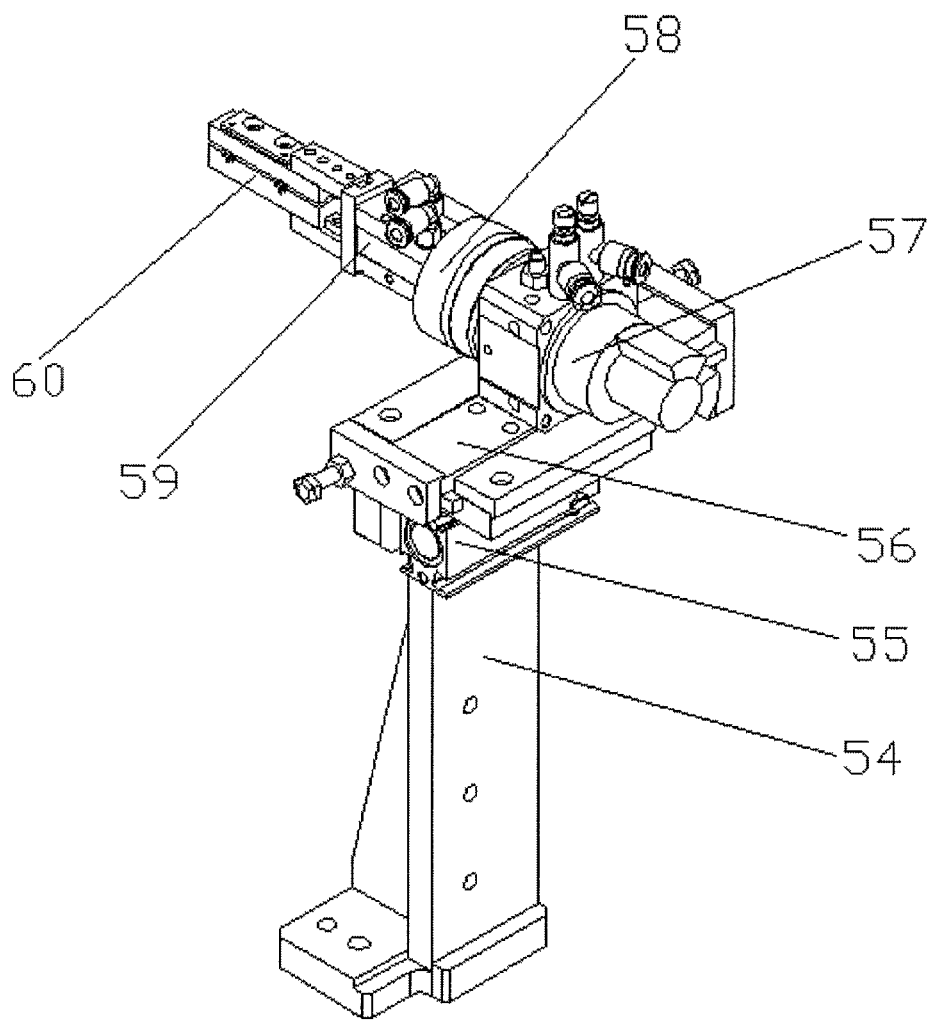
FIG. 10 is a schematic perspective view of the fastener rotation device of FIG. 9.
Figure 11:
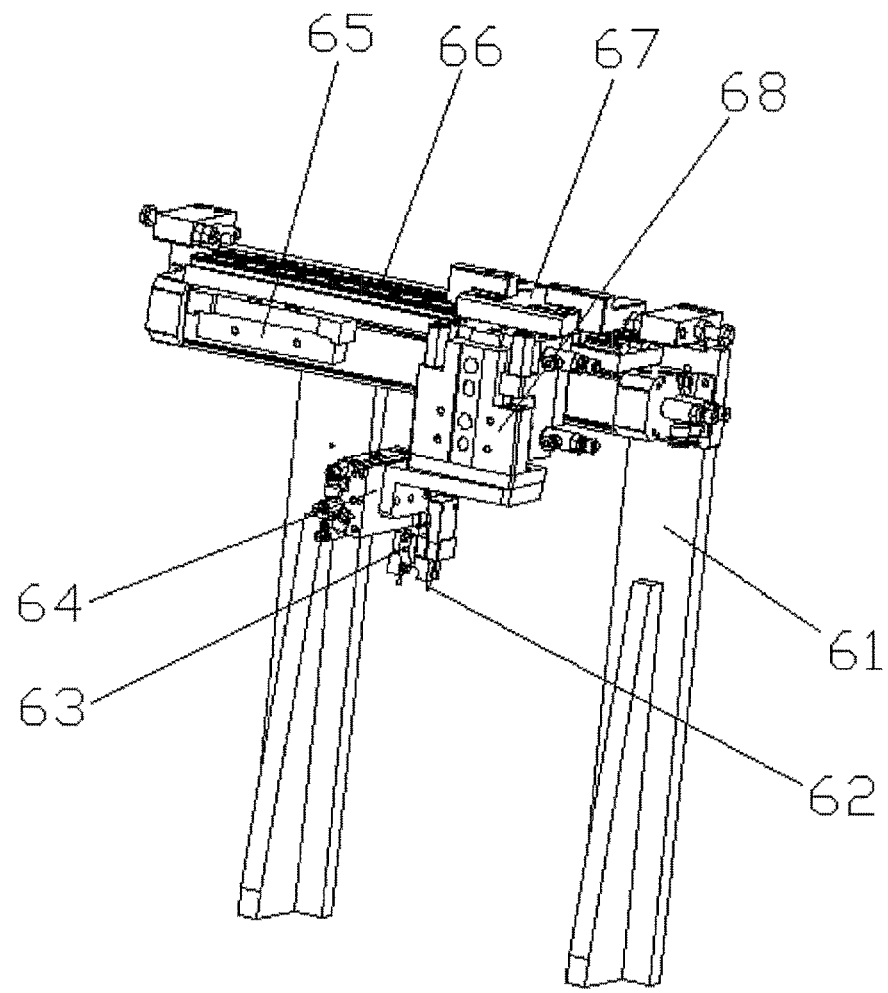
FIG. 11 is a schematic perspective view of the fastener conveying device of FIG. 9.
Figure 12:
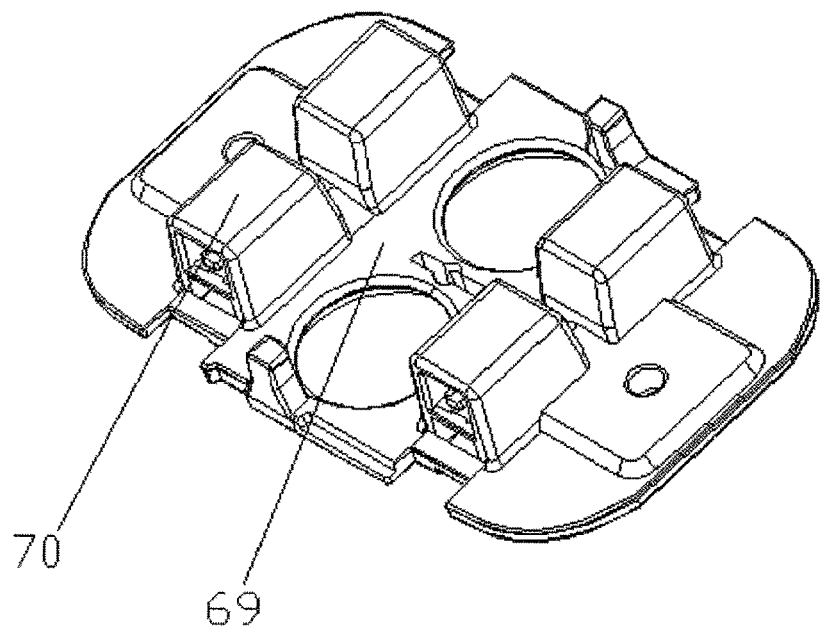
FIG. 12 is a schematic view showing the structure of rubber casing.
Figure 13:
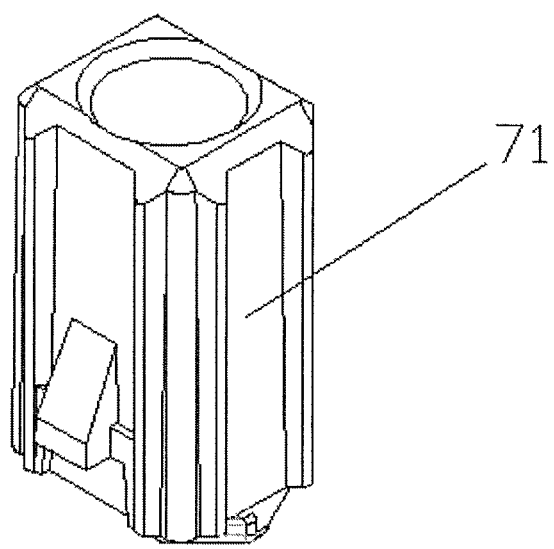
FIG. 13 is a schematic perspective view of the fastener.

As shown in FIGS. 1-13, the structure of the present invention is: an automatic spring fastener assembly machine, including a rack 1 and a power control box, the rack 1 is provided with a circulating conveying device 3, and a rubber casing feeding device, fastener feeding device and spring loading device, which are sequentially disposed around the circulating conveying device 3; the rubber casing feeding device includes a rubber casing feeding vibration tray 4 disposed to the left front side of the circulating conveying device 3, and the rubber casing feeding vibration tray 4 is connected with a rubber casing distributing block 15 through a rubber casing conveying track, a rubber casing transportation manipulator 5 fitting the rubber casing distributing block 15 is disposed above the circulating conveying device 3, and a rubber casing clamping device 11 located below the rubber casing transportation manipulator 5 is disposed on the right front side thereof; a fastener pushing in device 2 fitting the circulating conveying device 3 is disposed below the rubber casing clamping device 11, and the right side of the rubber casing transportation manipulator 5 is provided with a discharging device 10 located on the rack 1; all of the circulating conveying device, the rubber casing feeding vibration tray, the Rubber casing transportation manipulator, the rubber casing clamping device, the fastener pushing in device and the discharging device are electrically connected to the power control box.

Preferably, the circulating conveying device 3 includes a conveying support 12 disposed on the rack 1, the conveying support 12 is provided with a conveying drive motor 14 and a conveyor sprocket 13 fitting each other, fastener carriers 19 are evenly disposed on the conveyor sprocket 13 along the conveying direction, the left side of the conveying support 12 is provided with an excess material detection device 16 located between the rubber casing transportation manipulator 5 and the fastener feeding device, and the rear end of the conveying support 12 is provided with a carrier positioning device 17 located on the rack 1, and which is fitting the fastener carrier 19, a carrier support 18 fitting the bottom of the fastener carrier 19 is disposed below the carrier positioning device 17, and the carrier support 18 is on the rack 1; the conveying drive motor, excess material detection device and the carrier positioning device are electrically connected to the power control box.

Preferably, the fastener carrier 19 includes a carrier seat 21 provided on the conveyor sprocket 13, and the carrier seat 21 is provided with four fastener positioning sleeves 22, the fastener positioning sleeve 22 is internally provided with a through hole penetrating through the bottom of the carrier seat 21, and the through hole is provided with a slot fitting the fastener.

Preferably, the carrier positioning device 17 includes positioning support bracket 25 provided on the rack 1, a positioning lifting cylinder 24 is provided vertically downward on the positioning support bracket 25, the output end of the positioning lifting cylinder 24 is connected to a rod seat, and two sets of positioning rods 23 are symmetrically provided on the rod seat, and the positioning rod 23 can be plugged and fitted into a transportation positioning hole 20 provided on the carrier seat 21; the positioning lifting cylinder is electrically connected to the power control box.

Preferably, the rubber casing clamping device 11 includes a rubber casing clamping support 32 provided on the rack 1, a clamping and lifting cylinder 33 is disposed vertically upward on the rubber casing clamping support 32, and the output end of the clamping and lifting cylinder 33 is connected to a clamping and lifting table 31, one side of the clamping lifting platform 31 adjacent to the circulating conveying device 3 is horizontally disposed with a rubber casing rotating cylinder 28 along the conveying direction, and the other side thereof is vertically provided with a baffle pushing cylinder 30 along the conveying direction; the output end of the rubber casing rotating cylinder 28 is connected to a rubber casing rotating table 27, the front end of the rubber casing rotating table 27 is provided with a rubber casing clamping gripper 26 fitting the left and right side of the rubber casing; the output end of the baffle pushing cylinder 30 is connected to a upper baffle 29 slidably fitting the upper side of the rubber casing in the rubber casing clamping gripper 26, the rubber casing clamping gripper, the rubber casing rotating cylinder, the baffle pushing cylinder and the clamping and lifting cylinder are all electrically connected to the power control box.

Preferably, the fastener pushing in device 2 includes a fastener pushing in support 34 provided on the rack 1, a fastener pushing in cylinder 35 is vertically upward provided on the fastener pushing in support 34, and the output end of the fastener pushing in cylinder 35 is connected to a pushing in sliding block 36, and the upper end of the pushing in sliding block 36 is provided with a pushing rod pedestal 37, and the pushing rod pedestal 37 is provided with a fastener pushing rod 38 plug-in fitting the through hole within the carrier seat 21; the fastener pushing in cylinder is electrically connected to the power control box.

Preferably, the fastener feeding device includes a fastener feeding vibration tray 7 provided on the rack 1, the fastener feeding vibration tray 7 is sequentially connected with a fastener conveying track 47 and a fastener distributing block, the discharge end of the fastener distributing block is provided with a fastener rotating device 48, a fastener conveying device 6 is provided above the fastener rotating device 48, the fastener rotating device 48 includes a fastener rotating support seat 54 provided on the rack 1, the fastener rotating support seat 54 is horizontally provided with a fastener shuttling cylinder 55, the output end of the fastener shuttling cylinder 55 is connected to a fastener shuttling sliding block 56 slidably fitting the fastener rotating support seat 54, the fastener shuttling sliding block 56 is horizontally provided with a fastener rotating cylinder 57, the output end of the fastener rotating cylinder 57 is connected to a fastener rotating table 58, on the left end of the fastener rotating table 58 is horizontally provided with a fastener clamping cylinder 59, the left end of the fastener clamping cylinder 59 is provided with a fastener steering clamping claw 60 fitting the fastener distributing block, the fastener steering clamping claw 60 is provided with a fastener clamping slot connected to the discharge end of the fastener distributing block; all of the fastener feeding vibration tray, the fastener shuttling sliding block, the fastener rotating cylinder, the fastener clamping cylinder and the fastener steering clamping claw are electrically connected to the power control box.

Preferably, the fastener conveying device 6 includes a fastener conveying support 61 provided on the rack 1, and the fastener conveying support 61 is horizontally provided with a fastener conveying cylinder 65 and a fastener conveying sliding track 66 parallel to each other; the output end of the fastener conveying cylinder 65 is connected with a fastener conveying sliding block 67 slidably fitting the fastener conveying sliding track 66; the fastener conveying sliding block 67 is vertically downward provided with a fastener lifting cylinder 68, and the output end of the fastener lifting cylinder 68 is connected to a fastener reclaiming and positioning cylinder 64 provided vertically, the output end of the fastener reclaiming and positioning cylinder 64 is connected to a fastener feeding gripper 63 fitting the side of the fastener, and a fastener reclaiming rod 62 fitting the fastener is vertically disposed at the gap in the middle of the fastener feeding gripper 63; the fastener conveying cylinder, the fastener lifting cylinder, the fastener shuttling cylinder and the fastener feeding gripper are all electrically connected to the power control box.

Preferably, the spring loading device includes a spring feeding vibration tray 9 provided on the rack 1, and the spring feeding vibration tray 9 is sequentially connected to a spring conveying track 39 and a spring distributing block 53, the discharge end of the spring distributing block 53 is provided with a spring rotating device 46, a spring conveying device 8 is provided above the spring rotating device 46; the spring rotating device 46 includes a spring rotating support seat 49 provided on the rack 1, the spring rotating support seat 49 is horizontally provided with a spring front and rear cylinder, the output end of the spring front and rear cylinder is connected to a horizontally provided spring rotating cylinder 50, the output end of the spring rotating cylinder 50 is provided with a spring rotating table 51, on the left end of the spring rotating table 51 is horizontally disposed with a spring turning gripper 52 fitting the spring distributing block 53; the spring feeding vibration tray, the spring rotating cylinder and the spring turning gripper are all electrically connected to the power control box.

Preferably, the spring conveying device 8 includes a spring conveying support seat provided on the rack 1, the spring conveying support seat is horizontally provided with a spring conveying cylinder 45 and a spring conveying sliding track 44 parallel to each other, the output end of the spring conveying cylinder 45 is connected with a spring conveying sliding block 43 slidably fitting the spring conveying sliding track 44; the spring conveying sliding block 43 is vertically downward provided with a spring elevating cylinder 42, the output end of the spring elevating cylinder 42 is provided with a spring reclaiming and positioning cylinder 41, the output end of the spring reclaiming and positioning cylinder 41 is connected to a spring feeding jaw 40 fitting the spring rotating device 46; the spring feeding jaw, the spring front and rear cylinder, the spring elevating cylinder and the spring conveying cylinder are all electrically connected to the power control box.

When in use, the device is started, the conveyor sprocket 13 is rotated by the conveying drive motor 14 in the circulating conveying device 3, and thereby the fastener carrier 19 is cyclically circulated and sequentially passes through following five stations:

The excess material detection station:

The visual detector is capable of detecting the presence of accumulation on the fastener carrier, and sending corresponding information to the control center in time to facilitate the workers to make timely adjustments.

The carrier positioning station:

The conveying stops when the fastener carrier 19 moves to under the carrier positioning device 17, and then the positioning lifting cylinder 24 moves downward to make the left and right sets of positioning rods 23 respectively plug-in fit with the left and right side of the conveyor sprocket 13 to achieve precise positioning, and ensure that the fasteners and the springs can be fed more accurately.

The fastener feeding station:

The feed material into the fastener distributing block with the fastener feeding vibration tray 7, and the fastener shuttling cylinder 55 moves forward, to have the fastener steering clamping jaw 60 contact the discharge end of the fastener distributing block and clamp the fastener. Then the fastener shuttling cylinder 55 moves backward, the fastener steering clamping jaw 60 is separated from the fastener distributing block, and then the fastener rotating cylinder 57 drives the fastener to rotate 90°, thereby the fastener is vertically upward. The fastener reclaiming and positioning cylinder 64 then moves the fastener reclaiming rod 62 to orient to the center of the fastener on the fastener steering clamping jaw 60, the fastener lifting cylinder 68 moves downward to insert the fastener reclaiming rod 62 into the fastener, while at the same time, the fastener is clamped and lifted by the fastener feeding gripper 63. The fastener conveying cylinder 65 drives the fastener to the top of the fastener carrier 19 on the left side of the conveyor sprocket 13, and the fastener is vertically aligned with the center of the fastener positioning sleeve 22, then the fastener lifting cylinder 68 moves downward to insert the fastener into the fastener positioning sleeve 22, and thereby completes the fastener automatic feeding process.

The spring feeding station:

The spring feeding vibration tray 9 feeds into the spring distributing block 53, and the spring shuttling cylinder moves forward, so that the spring turning gripper 52 is attached to the discharge end of the spring distributing block 53 and thereby the spring is clamped. The spring shuttling cylinder moves backward to separate the spring turning gripper 52 from the spring distributing block 53. The spring rotating cylinder 50 drives the spring to rotate 90° so that the spring is vertically upward, and the spring reclaiming and positioning cylinder 41 moves to vertically align the spring feeding jaw 40 with the springs on the spring turning gripper 52. The spring elevating cylinder 42 moves downward to clamp and lift the spring, the spring conveying cylinder 45 drives the spring to the top of the fastener carrier 19 on the left side of the conveyor sprocket 13, and aligns the spring up and down with the center of the fastener positioning sleeve 22, thereby the fastener automatic feeding process is completed.

The fastener pushing station:

The rubber casing feeding vibration tray 4 sorts the rubber casings 69 into vertical direction and conveys them into the rubber casing distributing block 15, and the rubber casing transportation manipulator 5 transports the rubber casings 69 on the rubber casing distributing block 15 to the rubber casing clamping device 11, the rubber casing clamping jaws 26 clamp the left and right sides of the rubber casing, and then the baffle pushing cylinder 30 pushes the upper baffle 29 to the left, so that the upper baffle 29 blocks the upper side of the rubber casing 69 in the rubber casing gripper 26. Then lower the clamping and lifting cylinder 33 to connect the sockets 70 on the rubber casing 69 with the fastener positioning sleeves 22 on the carrier seat 21, and the fastener pushing rod 38 is pushed upward by the fastener pushing in cylinder 35, thereby the fastener pushing rod 38 is inserted from the bottom of the fastener positioning sleeve 22 and the fasteners 71 are pushed up, the fasteners 71 are inserted into the sockets 70 on the rubber casing 69. The automatic assembly of the spring fastener is thereby completed, and finally, the rubber casing transportation manipulator discharges the completed workpiece.

It should be noted that in the present invention, the term "including", "includes" or any other variant thereof is intended to cover a non-exlusive inclusion, such that a process, method, article, or device comprising a plurality of elements includes not only those elements. It also includes other elements that are not explicitly listed, or elements that are inherent to such a process, method, item, or device.

The principles and implementations of the present invention are described herein using specific examples. The foregoing description of the examples is merely to assist in understanding the method of the present invention and its core concepts. The foregoing is merely a preferred embodiment of the present invention, and it should be noted that due to the limited expression of words, and objectively there are infinite concrete structures. It will be apparent to those skilled in the art that various modifications, improvements, and changes may be made without departing from the principles of the invention, it is also possible to combine the above technical features in an appropriate manner. These improvements, modifications, or combinations, or the direct application of the inventive concepts and technical solutions to other applications without modification, are considered to be within the scope of the present invention.

What is claimed as new and desired to be covered by Letters Patent is:

1. An automatic spring fastener assembly machine, including a rack (1) and a power control box, wherein:
   the rack (1) is provided with a circulating conveying device (3), and a rubber casing feeding device, fastener feeding device and spring loading device, which are sequentially disposed around the circulating conveying device (3);
   the rubber casing feeding device includes a rubber casing feeding vibration tray (4) disposed to the left front side of the circulating conveying device (3), and the rubber casing feeding vibration tray (4) is connected with a rubber casing distributing block (15) through a rubber casing conveying track;
   a rubber casing transportation manipulator (5) fitting the rubber casing distributing block (15) is disposed above the circulating conveying device (3), and a rubber casing clamping device (11) located below the rubber casing transportation manipulator (5) is disposed on the right front side thereof;

a fastener pushing-in device (2) fitting the circulating conveying device (3) is disposed below the rubber casing clamping device (11), and the right side of the rubber casing transportation manipulator (5) is provided with a discharging device (10) located on the rack (1); and the circulating conveying device, the rubber casing feeding vibration tray, the rubber casing transportation manipulator, the rubber casing clamping device, the fastener pushing-in device, and the discharging device are all electrically connected to the power control box.

2. The automatic spring fastener assembly machine of claim 1, wherein:

the circulating conveying device (3) includes a conveying support (12) disposed on the rack (1), the conveying support (12) is provided with a conveying drive motor (14) and a conveyor sprocket (13) functioning together;

fastener carriers (19) are evenly disposed on the conveyor sprocket (13) along the conveying direction, the left side of the conveying support (12) is provided with an excess material detection device (16) located between the rubber casing transportation manipulator (5) and the fastener feeding device, and the rear end of the conveying support (12), which functions with a fastener carrier (19) is provided with a carrier positioning device (17) located on the rack (1);

a carrier support (18) fitting the bottom of the fastener carrier (19) is disposed below the carrier positioning device (17), and the carrier support (18) is on the rack (1); and the conveying drive motor, excess material detection device, and the carrier positioning device are all electrically connected to the power control box.

3. The automatic spring fastener assembly machine of claim 2, wherein the fastener carrier (19) includes a carrier seat (21) provided on the conveyor sprocket (13), and the carrier seat (21) is provided with four sets of fastener positioning sleeves (22), the interior of fastener positioning sleeves (22) is provided with through holes penetrating through the bottom of the carrier seat (21), and each through hole is provided with a slot fitting the fastener.

4. The automatic spring fastener assembly machine of claim 3, wherein the carrier positioning device (17) includes positioning support bracket (25) provided on the rack (1), a positioning lifting cylinder (24) is provided vertically downward on the positioning support bracket (25), the output end of the positioning lifting cylinder (24) is connected to a rod seat, and two sets of positioning rods (23) are symmetrically provided on the rod seat, and the positioning rod (23) can be plugged and fitted into a transportation positioning hole (20) provided on the carrier seat (21), the positioning lifting cylinder is electrically connected to the power control box.

5. The automatic spring fastener assembly machine of claim 2, wherein:

the rubber casing clamping device (11) includes a rubber casing clamping support (32) provided on the rack (1), a clamping and lifting cylinder (33) is disposed vertically upward on the rubber casing clamping support (32), and the output end of the clamping and lifting cylinder (33) is connected to a clamping and lifting table (31);

one side of the clamping lifting table (31) adjacent to the circulating conveying device (3) is horizontally provided with a rubber casing rotating cylinder (28) along the conveying direction, and the other side thereof is vertically provided with a baffle pushing cylinder (30) along the conveying direction;

the output end of the rubber casing rotating cylinder (28) is connected to a rubber casing rotating table (27), the front end of the rubber casing rotating table (27) is provided with a rubber casing clamping gripper (26) fitting the left and right side of the rubber casing;

the output end of the baffle pushing cylinder (30) is connected to a upper baffle (29) slidably fitting the upper side of the rubber casing in the rubber casing clamping gripper (26); and all of the rubber casing clamping gripper, the rubber casing rotating cylinder, the baffle pushing cylinder and the clamping and lifting cylinder are electrically connected to the power control box.

6. The automatic spring fastener assembly machine of claim 5, wherein:

the fastener pushing-in device (2) includes a fastener pushing-in support (34) provided on the rack (1);

a fastener pushing-in cylinder (35) is vertically upward provided on the fastener pushing-in support (34);

the output end of the fastener pushing-in cylinder (35) is connected to a pushing-in sliding block (36);

the upper end of the pushing in sliding block (36) is provided with a pushing rod pedestal (37);

the pushing rod pedestal (37) is provided with a fastener pushing rod (38) plug-in fitting the through-holes in the carrier seat (21); and the fastener pushing-in cylinder is electrically connected to the power control box.

7. The automatic spring fastener assembly machine of claim 1, wherein the fastener feeding device comprises a fastener feeding vibration tray (7) provided on the rack (1), the fastener feeding vibration tray (7) is sequentially connected with a fastener conveying track (47) and a fastener distributing block; the discharge end of the fastener distributing block is provided with a fastener rotating device (48); a fastener conveying device (6) is provided above the fastener rotating device (48), the fastener rotating device (48) includes a fastener rotating support seat (54) provided on the rack (1), the fastener rotating support seat (54) is horizontally provided with a fastener shuttling cylinder (55), the output end of the fastener shuttling cylinder (55) is connected to a fastener shuttling sliding block (56) slidably fitting the fastener rotating support seat (54); the fastener shuttling sliding block (56) is horizontally provided with a fastener rotating cylinder (57), the output end of the fastener rotating cylinder (57) is connected to a fastener rotating table (58), on the left end of the fastener rotating table (58) is horizontally provided a fastener clamping cylinder (59) and the left end of the fastener clamping cylinder (59) is provided with a fastener steering clamping claw (60) fitting the fastener distributing block, the fastener steering clamping claw (60) is provided with a fastener clamping slot connected to the discharge end of the fastener distributing block; all of the fastener feeding vibration tray, the fastener shuttling sliding block, the fastener rotating cylinder, the fastener clamping cylinder and the fastener steering clamping claw are electrically connected to the power control box.

8. The automatic spring fastener assembly machine of claim 7, wherein the fastener conveying device (6) comprises a fastener conveying support (61) provided on the rack (1), and the fastener conveying support (61) is horizontally provided with a fastener conveying cylinder (65) and a fastener conveying sliding track (66) parallel to each other; the output end of the fastener conveying cylinder (65)

is connected with a fastener conveying sliding block (67) slidably fitting the fastener conveying sliding track (66); the fastener conveying sliding block (67) is vertically downward provided with a fastener lifting cylinder (68), and the output end of the fastener lifting cylinder (68) is connected to a fastener reclaiming and positioning cylinder (64) provided vertically, the output end of the fastener reclaiming and positioning cylinder (64) is connected to a fastener feeding gripper (63) fitting sides of the fastener, and a fastener reclaiming rod (62) fitting the fastener is vertically disposed at the gap in the middle of the fastener feeding gripper (63); the fastener conveying cylinder, the fastener lifting cylinder, the fastener shuttling cylinder and the fastener feeding gripper are all electrically connected to the power control box.

9. The automatic spring fastener assembly machine of claim 1, wherein the spring loading device includes a spring feeding vibration tray (9) provided on the rack (1), and the spring feeding vibration tray (9) is sequentially connected to a spring conveying track (39) and a spring distributing block (53); the discharge end of the spring distributing block (53) is provided with a spring rotating device (46), a spring conveying device (8) is provided above the spring rotating device (46); the spring rotating device (46) includes a spring rotating support seat (49) provided on the rack (1), the spring rotating support seat (49) is horizontally provided with a spring shuttling cylinder, the output end of the spring shuttling cylinder is connected to a horizontally provided spring rotating cylinder (50), the output end of the spring rotating cylinder (50) is provided with a spring rotating table (51), on the left end of the spring rotating table (51) is horizontally disposed with a spring turning gripper (52) fitting the spring distributing block (53); the spring feeding vibration tray, the spring rotating cylinder and the spring turning gripper are electrically connected to the power control box.

10. The automatic spring fastener assembly machine of claim 9, wherein:
  the spring conveying device (8) comprises a spring conveying support seat provided on the rack (1);
  the spring conveying support seat is horizontally provided with a spring conveying cylinder (45) and a spring conveying sliding track (44) parallel to each other;
  the output end of the spring conveying cylinder (45) is connected with a spring conveying sliding block (43) slidably fitting the spring conveying sliding track (44);
  the spring conveying sliding block (43) is vertically downward provided with a spring elevating cylinder (42);
  the output end of the spring elevating cylinder (42) is provided with a spring reclaiming and positioning cylinder (41);
  the output end of the spring reclaiming and positioning cylinder (41) is connected to a spring feeding jaw (40) fitting the spring rotating device (46); and
  the spring feeding jaw, the spring front and rear cylinder, the spring elevating cylinder, and the spring conveying cylinder are electrically connected to the power control box.

\* \* \* \* \*